United States Patent [19]
Takahashi et al.

[11] Patent Number: 5,708,482
[45] Date of Patent: Jan. 13, 1998

[54] IMAGE-SIGNAL CLAMPING CIRCUIT FOR ELECTRONIC ENDOSCOPE

[75] Inventors: Akihiro Takahashi; Kohei Iketani, both of Tokyo, Japan

[73] Assignee: Asahi Kogaku Kogyo Kabushiki Kaisha, Tokyo, Japan

[21] Appl. No.: 525,136

[22] Filed: Sep. 8, 1995

[30] Foreign Application Priority Data

| Sep. 8, 1994 | [JP] | Japan | 6-214479 |
| Sep. 8, 1994 | [JP] | Japan | 6-214480 |
| Sep. 9, 1994 | [JP] | Japan | 6-215425 |
| Sep. 21, 1994 | [JP] | Japan | 6-226124 |

[51] Int. Cl.$^6$ .......................... H04N 5/16; H04N 5/18
[52] U.S. Cl. ................ 348/695; 348/689; 348/257; 348/677
[58] Field of Search .............. 348/65, 71, 689, 348/695, 696, 677, 257; H04N 5/16, 5/18

[56] References Cited

U.S. PATENT DOCUMENTS

| 3,927,255 | 12/1975 | Yorkanis | 178/7.3 DC |
| 4,254,434 | 3/1981 | Suzuki | 358/147 |
| 4,706,118 | 11/1987 | Kato et al. | 358/98 |
| 4,971,035 | 11/1990 | Ito | 128/6 |
| 5,008,753 | 4/1991 | Kitaura et al. | 358/171 |
| 5,325,847 | 7/1994 | Matsuno | 128/4 |
| 5,408,335 | 4/1995 | Takahashi et al. | 358/431 |
| 5,461,489 | 10/1995 | Ohara et al. | 358/409 |

FOREIGN PATENT DOCUMENTS

| 0022763 | 1/1991 | Japan | H04N 5/18 |
| 4040078 | 2/1992 | Japan | H04N 5/16 |
| 6-46287 | 2/1994 | Japan. | |

OTHER PUBLICATIONS

English Language Abstract of JP-6-46287.

*Primary Examiner*—Glenton B. Burgess
*Attorney, Agent, or Firm*—Greenblum & Bernstein P.L.C.

[57] ABSTRACT

An image-signal clamping circuit processes image signals obtained from a solid state image sensor provided at a distal end of an electronic endoscope which do not have a direct-current component to restore a direct-current component thereof. The clamping circuit is arranged such that the restoration of a direct-current component of an image signal can be properly and stably carried out. The clamping circuit includes a sample-and-hold circuit to temporarily store an image signal, an analog-to-digital converter to output digital image signals, a device for digitally correcting the digital image data, and a digital-to-analog converter to output corrected analog image signals. The pedestal level of the corrected output analog image signal approximates a reference pedestal level.

14 Claims, 16 Drawing Sheets

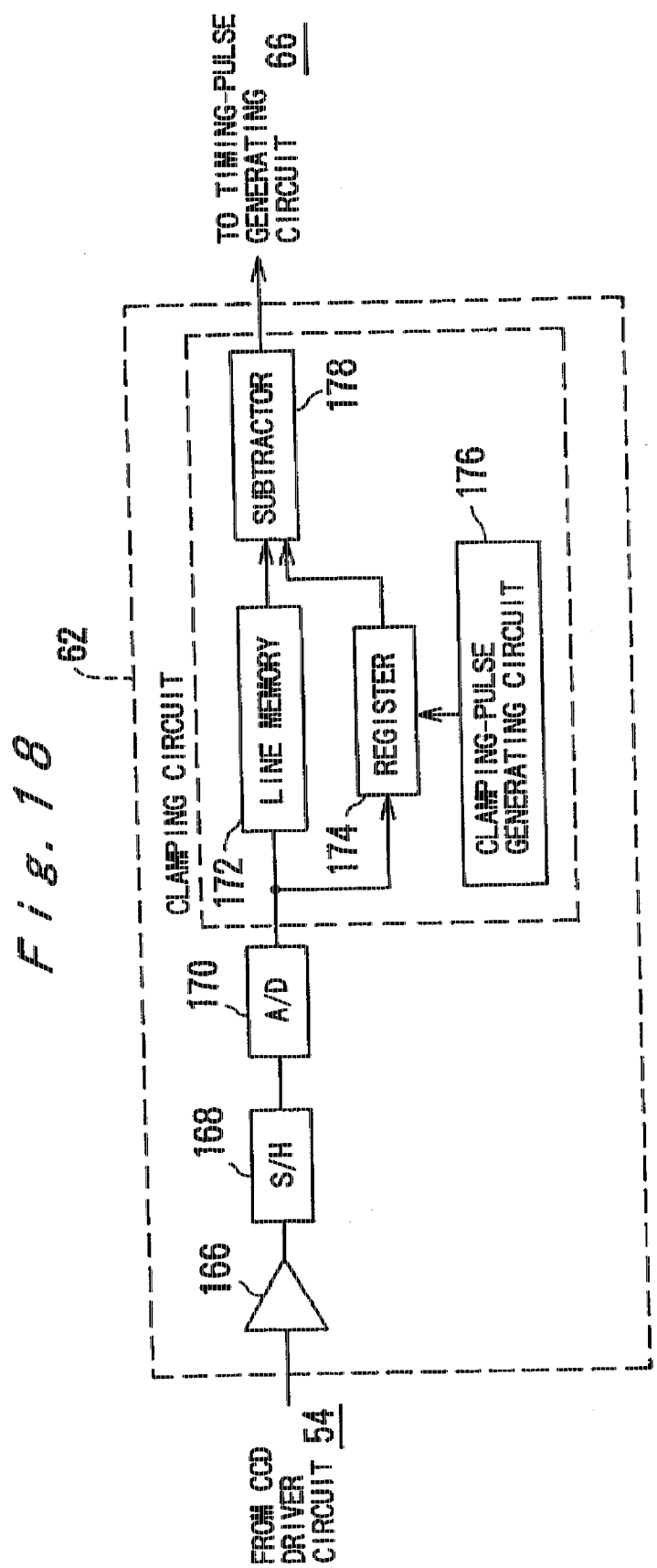

IMAGE-SIGNAL CLAMPING CIRCUIT FOR ELECTRONIC ENDOSCOPE

BACKGROUND OF THE INVENTION

1. Field of the Invention

The present invention relates to an image-signal clamping circuit for processing image signals, obtained from a solid state image sensor provided at a distal end of an electronic endoscope which do not have a direct-current component, to restore a direct-current component thereto.

2. Description of the Related Art

An electronic endoscope includes an objective lens system provided at a distal end thereof, and the lens system is associated with a solid image sensor such as a CCD (charge coupled device) image sensor such that an image to be picked up is focussed on a light receiving surface of the image sensor by the lens system. The endoscope also includes a light guide device which may be formed by a bundle of optical fibers. The light guide device terminates at a light-emitting end face at the distal end of the endoscope for illuminating a front area thereof. Nevertheless, the front area of the distal end of the endoscope cannot be uniformly illuminated by the light-emitting end face of the light guide device.

The image sensor produces analog image signals by the illumination of the light guide device, and the image signals are successively read out by a suitable driver circuit. Each of the read-out image signals, which corresponds to one horizontal scanning line, has an effective image period including a real image signal, and a black level period indicating a provisional pedestal level, and does not have a direct-current component. Accordingly, the real image signal must be clamped on the basis of the black level by an image-signal clamping circuit, to thereby restore the direct-current component of the image signal. In this case, it is necessary to correct the black level of the individual image signals, before the direct-current component of each image signal can be properly and stably restored, because uniform illumination cannot be obtained as mentioned above.

Unexamined Japanese Patent Publication (KOKAI) 6-46287 discloses an image-signal clamping circuit constituted such that the black level can be corrected for the individual image signals. Nevertheless, the correction of the black level cannot be satisfactorily carried out for the reasons stated hereinafter in detail.

SUMMARY OF THE INVENTION

Therefore, an object of the present invention is to provide an image-signal clamping circuit for processing image signals obtained from a solid state image sensor provided at a distal end of an electronic endoscope, wherein a restoration of a direct-current component of the image signal can be properly and stably can be carried out.

In accordance with the present invention, there is provided an image-signal clamping circuit for processing image signals obtained from a solid state image sensor provided at a distal end of an electronic endoscope. The circuit comprises a fixation device for setting a pedestal level of an image signal obtained from the solid state image sensor, a conversion device for converting the image signal into digital image data, a preparation device for preparing digital correcting data on the basis of pedestal level data of the digital image data, and a second conversion device for converting the digital correcting data into analog correcting data. The setting of the pedestal level of the image signal is carried out on the basis of the analog correcting data, where the pedestal level of the image signal is corrected to approximate an ideal pedestal level.

In this image-signal clamping circuits the fixation device may comprise a sample-and-hold circuit for temporarily holding the image signal, a capacitor connected to an output of the sample-and-hold circuit, a switch provided between the capacitor and the second conversion device, and a clamping-pulse generation circuit for outputting a clamping pulse to the switch such that the switch is turned ON over a period of time corresponding to a width of the clamping pulse. Also, the first conversion device may comprise an analog-digital converter connected to the capacitor, the second conversion device comprises a digital-analog converter connected to the switch, and the preparation device may comprise a look-up table provided between the analog-digital converter and the digital-analog converter.

In accordance with the present invention, there is also provided an image-signal clamping circuit for processing image signals obtained from a solid state image sensor provided at a distal end of an electronic endoscope. The circuit comprises a fixation device for setting a pedestal level of an image signal obtained from the solid state image sensor, a first conversion device for converting the image signal into digital image data, a gamma-correction device for subjecting the digital image data to a gamma-correction, the gamma-correction device being constituted such that pedestal level data of the digital image data is amplified, a preparation device for preparing digital correcting data on the basis of the amplified pedestal level data of the digital image data, a and second conversion device for converting the digital correcting data into analog correcting data. The setting of the pedestal level of the image signal is carried out on the basis of the analog correcting data, where the pedestal level of the image signal approximates an ideal pedestal level after correction.

In this image-signal clamping circuit, the fixation device may comprise a sample-and-hold circuit for temporarily holding the image signal, a capacitor connected to an output of the sample-and-hold circuit, a switch provided between the capacitor and the second conversion device, and a clamping-pulse generation circuit for outputting a clamping pulse to the switch such that the switch is turned ON over a period of time corresponding to a width of the clamping pulse. Also, the first conversion device may comprise an analog-digital converter connected to the capacitor, the second conversion device may comprise a digital-analog converter connected to the switch, the gamma-correction device comprises a look-up table connected to an output of the analog-digital converter, and the preparation device may comprise a subtractor connected between the look-up table and the digital-analog converter.

In accordance with the present invention, there is further provided an image-signal clamping circuit for processing image signals obtained from a solid state image sensor provided at a distal end of an electronic endoscope. The circuit comprises a fixation device for setting a pedestal level of an image signal obtained from the solid state image sensor, a first conversion device for converting the image signal into digital image data, a preparation device for preparing digital correcting data on the basis of pedestal level data of the digital image data, a filter for eliminating noise from the digital correcting data, and a second conversion device for converting the filtered digital correcting data into analog correcting data. The fixing of the pedestal level of the image signal is carried out on the basis of the analog correcting data, where the pedestal level of the image signal approximates an ideal pedestal level after correction.

In this image-signal clamping circuit, the fixation device may comprise a sample-and-hold circuit for temporarily holding the image signal, a capacitor connected to an output of the sample-and-hold circuit, a switch provided between the capacitor and the second conversion device, and a clamping-pulse generation circuit for outputting a clamping pulse to the switch such that the switch is turned ON over a period of time corresponding to a width of the clamping pulse. Also, the first conversion device may comprise an analog-digital converter connected to the capacitor, and the second conversion device may comprise a digital-analog converter connected to the switch. In this case, the preparation device is connected to an output of the analog-digital converter, and the filter is provided between the preparation device and the digital-analog converter.

In accordance with the present invention, there is further provided an image-signal clamping circuit for processing image signals obtained from a solid state image sensor provided at a distal end of an electronic endoscope. The circuit comprises a fixation device for setting a pedestal level of an image signal obtained from the solid state image sensor, a first conversion device for converting the image signal into digital image data, a preparation device for preparing digital correcting data on the basis of pedestal level data of the digital image data, a second conversion device for converting the digital correction data into analog correcting data, and a filter device for eliminating noise from the analog correcting data. The setting of the pedestal level of the image signal is carried out on the basis of filtered analog correcting data, where the pedestal level of the image signal approximate an ideal pedestal level after correction.

In this image-signal clamping circuit, the fixation device may comprise a sample-and-hold circuit for temporarily holding the image signal, a capacitor connected to an output of the sample-and-hold circuit, a switch provided between the capacitor and the second conversion device, and a clamping-pulse generation circuit for outputting a clamping pulse to the switch such that the switch is turned ON over a period of time corresponding to a width of the clamping pulse. Also, the first conversion device may comprise an analog-digital converter connected to the capacitor, the second conversion device may comprise a digital-analog converter connected to the switch. In this case, the preparation device is provided between the analog-digital converter and the digital-analog converter, and the filter is provided between the switch and the digital-analog converter.

In accordance with the present invention, there is further provided an image-signal clamping circuit for processing image signals obtained from a solid state image sensor provided at a distal end of an electronic endoscope. The circuit comprises a conversion device for converting an image signal, obtained from the solid state image sensor, into digital image data, a first storage device for temporarily storing actual image data of the digital image data, a second storage device for temporarily storing pedestal level data of the digital image data, and a calculation device for calculating a difference between the actual image data and the pedestal level data so as to digitally fix a pedestal level of the image signal.

BRIEF DESCRIPTION OF THE DRAWINGS

The objects and advantages of the present invention will be better understood from the following description, with reference to the accompanying drawings in which:

FIG. 18 is a block diagram showing a fourth embodiment of the CCD processing circuit of the electronic endoscope system of FIG. 4.

DESCRIPTION OF THE PREFERRED EMBODIMENTS

Figure 1:
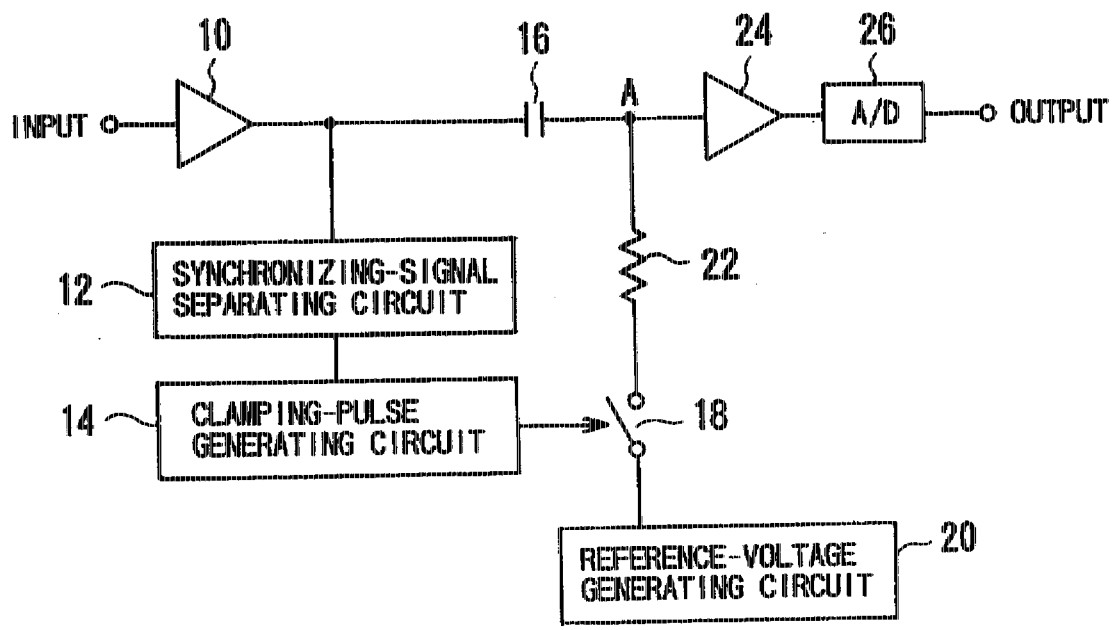
FIG. 1 is a block diagram showing a conventional image-signal clamping circuit.

FIG. 1 shows a conventional image-signal clamping circuit, which is disclosed as a prior art in Unexamined Japanese Patent Publication (KOKAI) 6-46287, for processing an analog image signal, obtained from a solid state image sensor provided at a distal end of an electronic endoscope not having a directed-current component. In this image signal clamping circuit, a first amplifier 10 amplifies the analog image signal, and the amplified image signal is outputted to a synchronizing-signal separating circuit 12 and a capacitor 16. The synchronizing-signal separating circuit 12 separates a horizontal synchronizing signal from the amplified image signal, and a clamping-pulse generating circuit 14 produces a clamping pulse in synchronization with the separated horizontal synchronizing signal.

Figure 2:
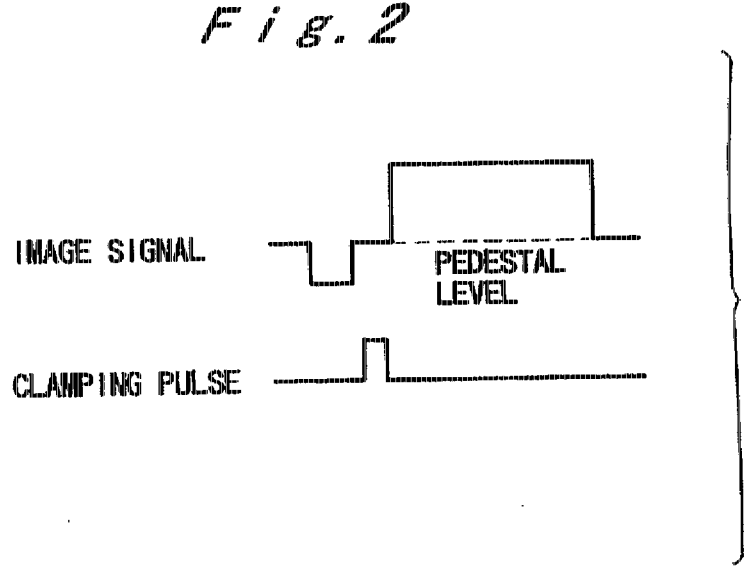
FIG. 2 is a time chart showing a relationship between an image signal and a clamping pulse in the image-signal clamping circuit.

When the clamping pulse (FIG. 2) is outputted from the clamping-pulse generating circuit 14 to a switch 18, this switch is turned ON for a period of time corresponding to a width of the clamping pulse, so that the capacitor 16 is electrically charged by a reference-voltage generating circuit 20 through a resistor 22. Accordingly, a potential of a location A is fixed at a reference voltage outputted from the reference-voltage generating circuit 20, and thus a direct-current component of the amplified image signal is restored, as shown in FIG. 2. The image signal having the direct-current component is further amplified by a second amplifier 24, and is then converted into a digital video signal by an analog-digital (A/D) converter 26.

Nevertheless, in this conventional clamping circuits, the restoration of the direct-current component cannot be properly and stably carried out, because the charging of the capacitor 16 by the reference-voltage generating circuit 20 involves a time constant defined by the characteristics of the capacitor 16 and the resistor 22. In particular, the potential of location A is variable, and thus cannot be necessarily fixed at the reference voltage of the reference-voltage generating circuit 20, resulting in an improper and unstable restoration of a direct-current component of the image signal. Thus, the image cannot be reproduced with the high fidelity required by an endoscope.

Figure 3:
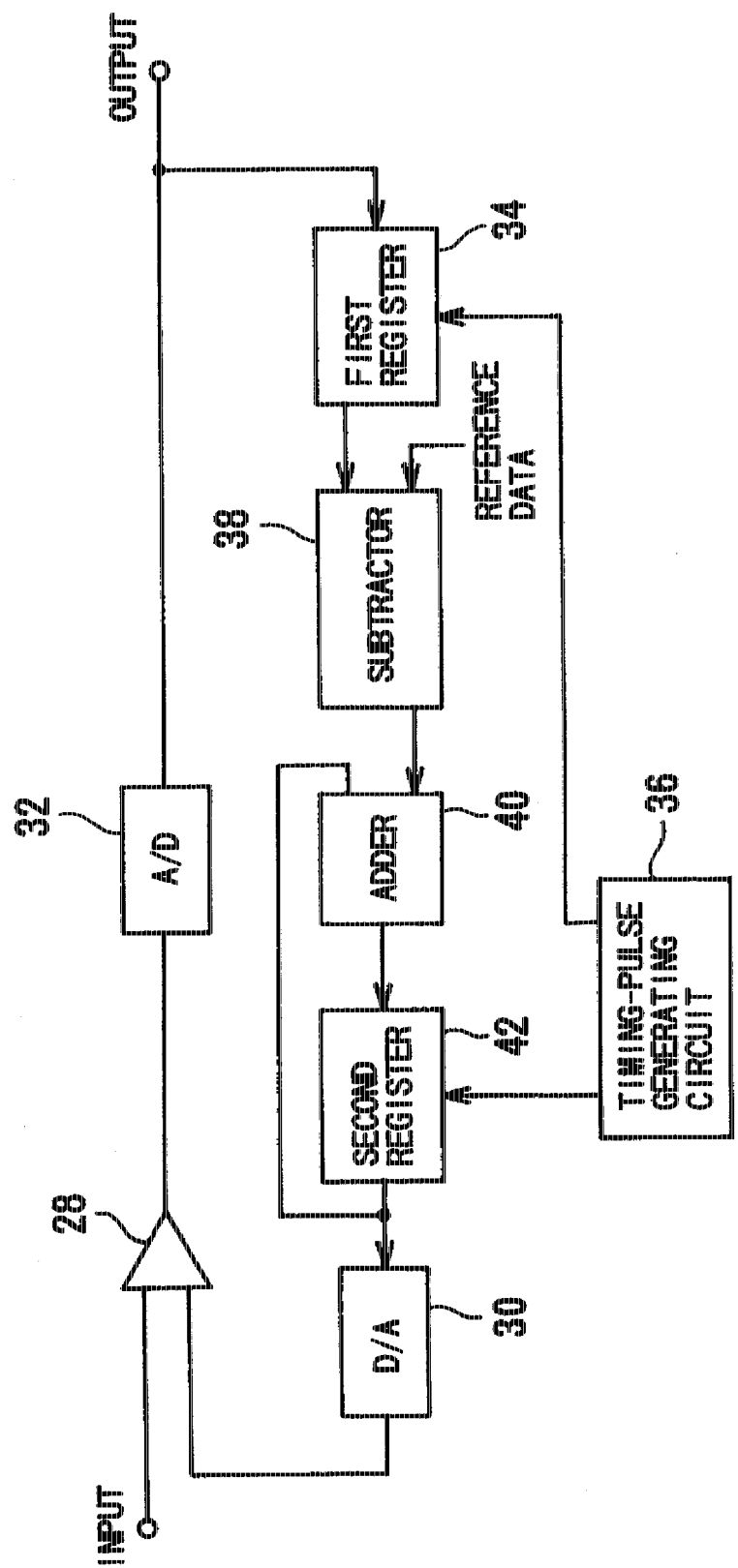
FIG. 3 is a block diagram showing another conventional image-signal clamping circuit directed to an improvement of the image-signal clamping circuit of FIG. 1.

FIG. 3 shows an image-signal clamping circuit as disclosed in Unexamined Japanese Patent Publication (KOKAI) 6-46287, which is directed to an improvement of the conventional image-signal clamping circuit as discussed above. In this improved clamping circuit, an image signal not having a direct-current component is inputted to a differential amplifier 28, and is given a direct-current component on the basis of a correcting voltage outputted from a digital analog converter 30 to the differential amplifier 28. Namely, the image signal is clamped by the correcting voltage outputted from the digital-analog (D/A) converter 30, and is outputted from the differential amplifier 28. The clamped image signal having the direct-current component is converted into a digital video signal by an analog-digital (A/D) converter 32, and the digital video signal is outputted from the clamping circuit.

On the other hand, the digital video signal is inputted to a first register 34, and a pedestal level of the digital video signal is detected and stored as pedestal-level data in the first register 34 by a first timing signal outputted from a timing-signal generating circuit 36 to the first register 34. The pedestal-level data is outputted from the first register 34 to a subtractor 38, at which a reference data exhibiting a reference pedestal level is subtracted from the pedestal-level data. This differential data so obtained represents an error in the pedestal level of the image signal. Then, the differential data is outputted from the subtractor 38 to an adder 40, at which the differential data is added to a correcting voltage data stored in a second register 42. Note that the above-mentioned correcting voltage outputted from the digital-analog (D/A) converter 30 is derived from the correcting voltage data stored in the second register 42.

The summed data obtained at the adder 40 is inputted to the second register 42, and is stored as a new correcting voltage data therein by a second timing signal outputted from the timing-signal generating circuit 36 to the second register 42. The new correcting voltage data is converted into a new correcting voltage by the digital-analog (D/A) converter 30, and the new correcting voltage is outputted to the differential amplifier 28 to clamp a next image signal by the new correcting voltage outputted from the digital-analog (D/A) converter 30. Thus, the restoration of the direct-current component of an image signal can be more properly and stably carried out, in comparison with the image-signal clamping circuit shown in FIG. 1.

Nevertheless, the image-signal clamping circuit shown in FIG. 3 is still unsatisfactory in reproducing the image with the high fidelity required by an endoscope. This is because a correcting voltage outputted from the digital-analog (D/A) converter 30 may include an error, due to the fact that there is a time lag in preparing the correcting voltage data at the circuit including the first register 34, the subtractor 38, the adder 40, and the second register 42. Especially, when an image signal undergoes an abrupt changes the correcting voltage outputted from the digital-analog (D/A) converter 30 may include a relatively large error.

Figure 4:
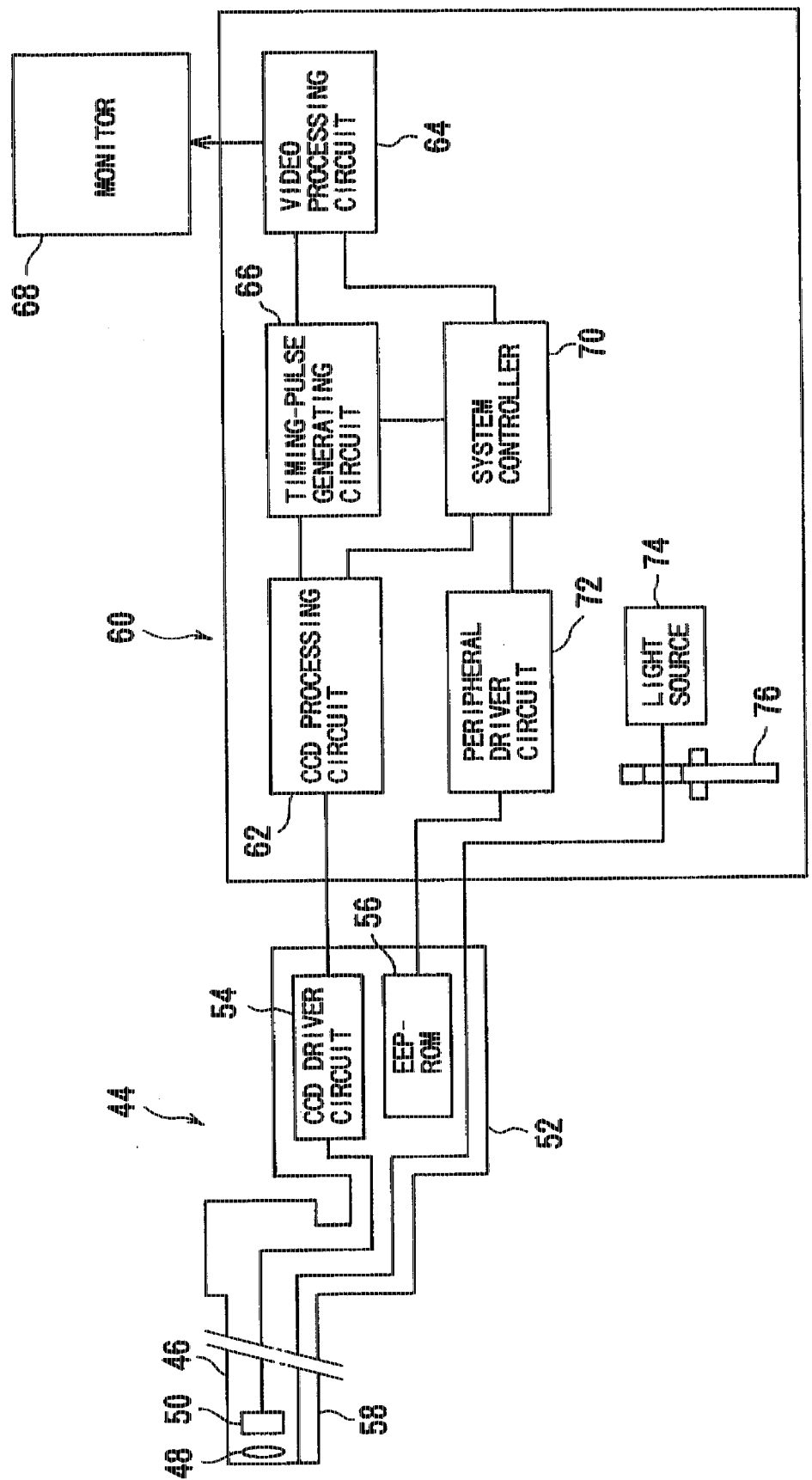
FIG. 4 is a block diagram showing an electronic endoscope system in which the present invention is embodied.

FIG. 4 shows an electronic endoscope system as a block diagram, in which the present invention is embodied. The electronic endoscope system comprises an electronic endoscope 44, a part of which is formed as a flexible conduit section 46 so as to be inserted into, for example, a body cavity of a patient. The endoscope 44 includes an object lens system 48 provided at a distal end thereof, and the lens system 48 is associated with a solid image sensor such as a CCD (charge coupled device) image sensor 50 such that an image to be picked up is focussed on a light receiving surface of the image sensor 50 by the lens system 48. A proximal end of the endoscope 44 is formed as a connector 52, and this connector includes a CCD driver 54 for driving the CCD image sensor 50 to read out image signals therefrom, and a memory 56 such as an erasable and electrically programmable read only memory (EEPROM) for storing data required to operate the endoscope 44. The endoscope 44 further includes a light guide 58 which may be formed by a bundle of optical fibers, and the light guide 58 terminates a light-emitting end face at the distal end of the endoscope 44 for illuminating a front area thereof.

The endoscope 44 is detachably coupled by the connector 52 to a video processor 60 forming a part of the electronic endoscope system. The video processor 60 includes a CCD processing circuit 62 having an image-signal clamping circuit constituted in accordance with the present invention and explained in detail hereinafter. When the endoscope 44 is coupled to the video processor 60, the CCD processing circuit 62 is connected to the CCD driver circuit 54.

The image signals read out from the CCD image sensor 50 by the CCD driver 54 are successively inputted to the CCD processing circuit 62, at which a direct-current component of each image signal is restored in accordance with the present invention, and then the image signals each having the restored direct-current component are successively converted into digital video signals in the CCD processing circuit 62. The converted digital video signals are fed from the CCD processing circuit 62 to a video processing circuit 64 through a timing-pulse generating circuit 66, and the digital video signals are processed at the video processing circuit 64 so as to reproduce an image on a monitor 68.

The video processor 60 also includes a system controller 70 having a central processing unit (CPU), by which the CCD processing circuit 62, the timing-pulse generating circuit 66, and the video processing circuit 64 are controlled. When the endoscope 44 is coupled to the video processor 60, the system controller 70 is connected to the memory 56 through a peripheral driver circuit 72 to retrieve the data from the memory 56.

The video processor 60 further includes a light source 74, and a rotary color filter 76 associated therewith. The light source 74 is connected to the light guide 58 through the rotary color filter 76 when the endoscope 44 is coupled to the video processor 60. The rotary color filter 76 includes three filter elements each having one of the three primary colors (R, G, B), and is constituted such that red light, green light, and blue light are repeatedly emitted from the light emitting end face of the light guide 58 at regular intervals. Namely, the image signals read out from the CCD image sensor 50 by the CCD driver circuit 54 include red image signals, green image signals, and blue image signals, and the video processor 60 processes these color image signals so as to reproduce a full color image on the monitor 68.

Figure 5:
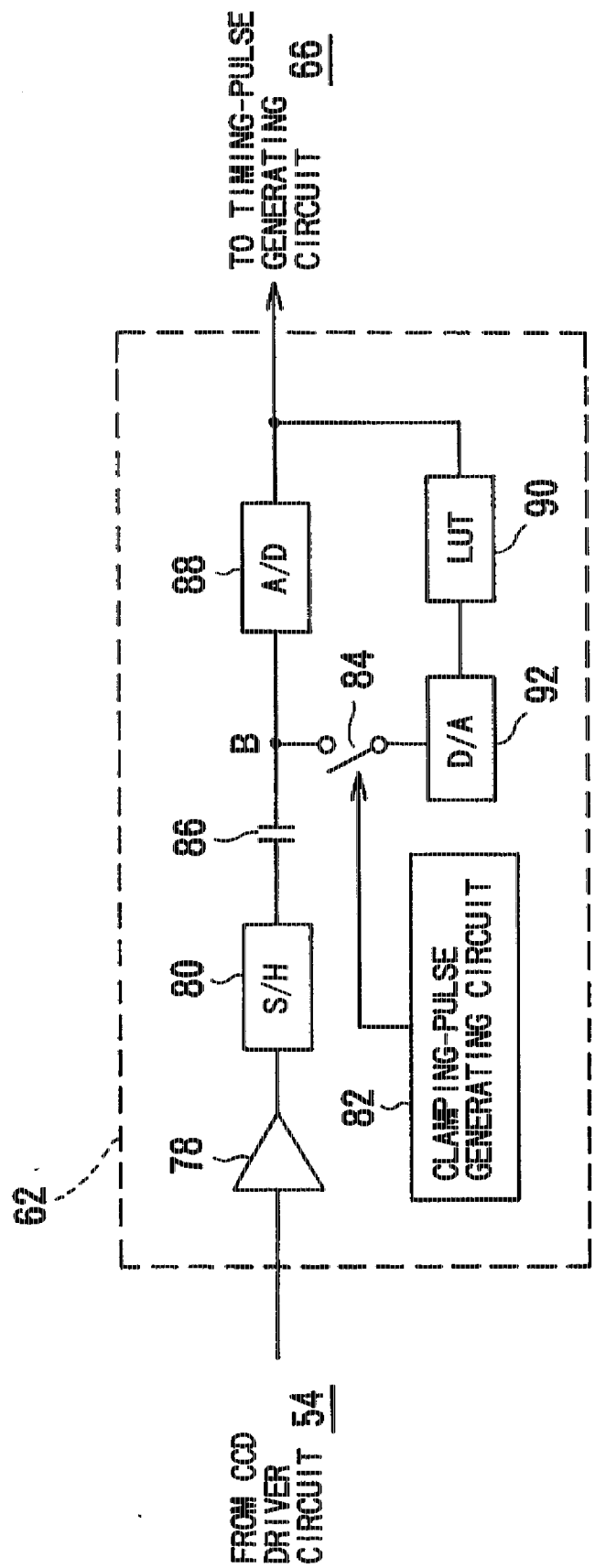
FIG. 5 is a block diagram showing a first embodiment of a CCD processing circuit forming a part of the electronic endoscope system of FIG. 4.

FIG. 5 shows a first embodiment of the CCD processing circuit 62 constituted in accordance with the present invention. In this first embodiments an amplifier 78 amplifies an image signal outputted from the CCD driver circuit 54, and the amplified image signal outputted from the amplifier 78 is held by a sample-and-hold circuit (S/H) 80. Note, the image signal held by the sample-and-hold circuit 80 does not have a direct-current component. A clamping-pulse generating circuit 82 produces a clamping pulse during a horizontal blanking period of the image signal. When the clamping pulse is outputted from the clamping-pulse generating circuit 82 to a switch 84, the switch 84 is turned on for over a period of time corresponding to a width of the clamping pulses so that a capacitor 86 is electrically charged so that a potential of a location B is fixed as a pedestal level. Then, an analog value of the pedestal level is converted into a digital pedestal level data by an analog-digital (A/D) converter 88.

The digital pedestal level data is outputted from the A/D converter 88 to a look-up table (LUT) 90, and this look-up table is constituted such that correcting data is outputted therefrom in accordance with the value of the digital pedestal level data inputted to the look-up table 90. The correcting data is outputted from the look-up table 90 to a digital-analog (D/A) converter 92 at which the correcting data is converted into a correcting voltage. While the switch 84 is turned ON, the correcting voltage is applied to the capacitor 86, so the potential of location B is corrected to be brought close to an ideal pedestal level.

Figure 6:
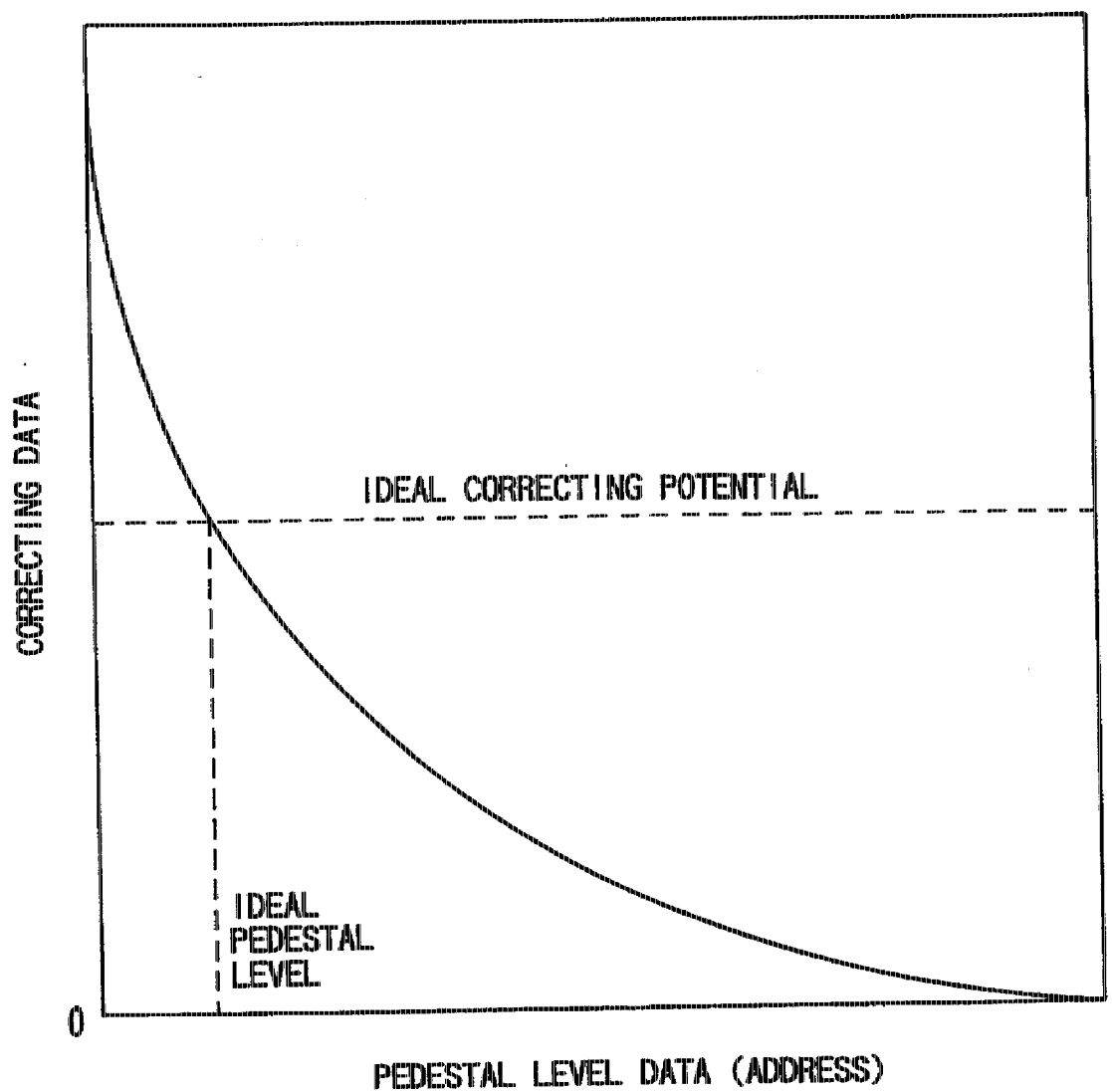
FIG. 6 is a graph showing an input/output characteristic of a look-up table used in the first embodiment of FIG. 5.

In particular, for example, the look-up table 90 may have an input/output characteristic (i.e., a relationship between the digital pedestal level data and the correcting data) as shown in the graph of FIG. 6. As is apparent from this graph, when a value of the digital pedestal level data is larger than the ideal pedestal level, the correcting data outputted from the look-up table 90 has a value such that the potential of location B is lowered. Similarly, when a value of the digital pedestal level data is smaller than the ideal pedestal level, the correcting data outputted from the look-up table 90 has a value such that the potential of location B is raised. Also, the larger the difference between the digital pedestal level data and the ideal pedestal level, the larger the value of the correcting data outputted from the look-up table.

Figure 7:
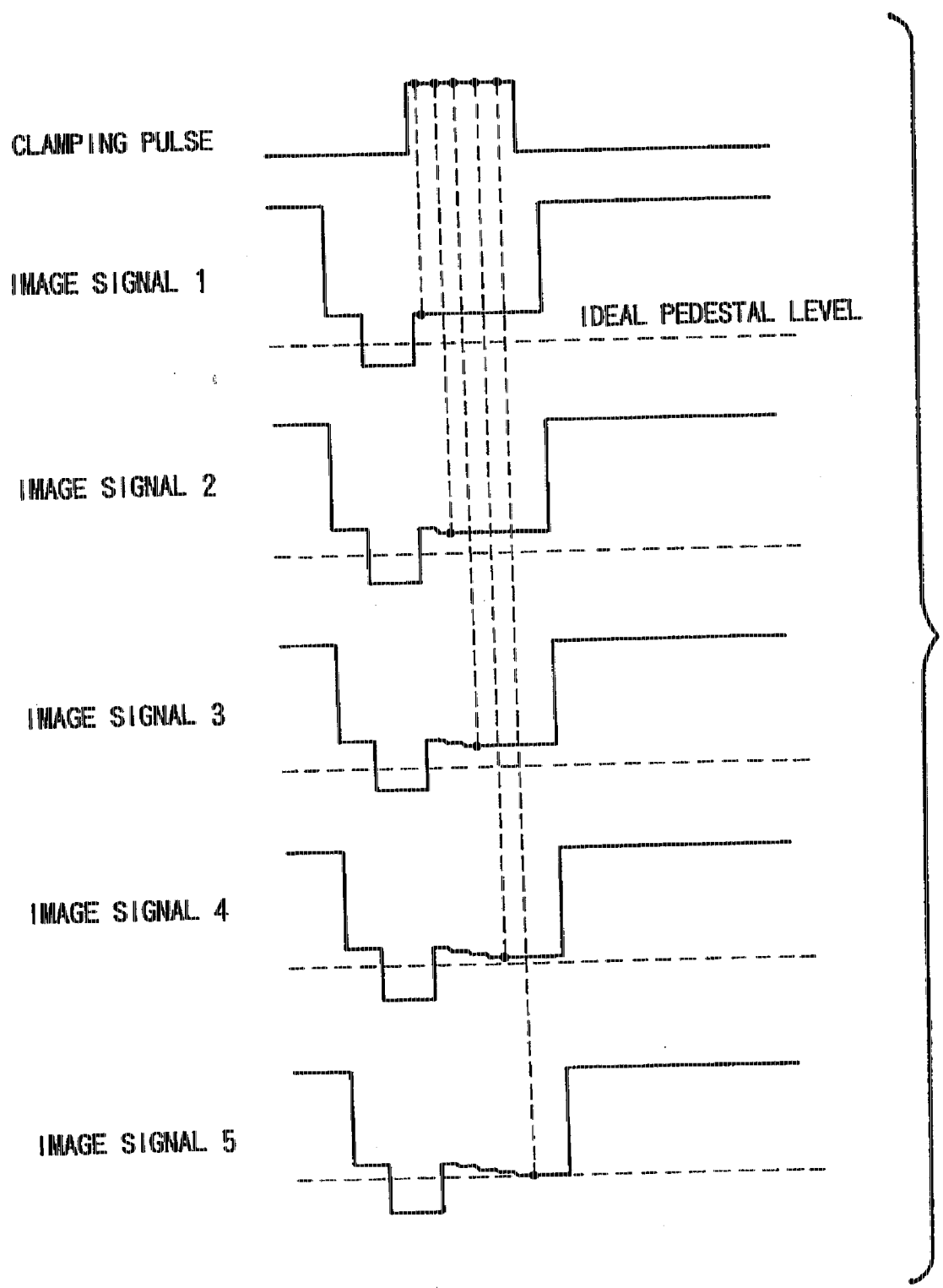
FIG. 7 is a timing diagram for explaining a correction of a pedestal level in the first embodiment of FIG. 5.

Accordingly, as shown in FIG. 7, by repeating the correction of the potential of location B several times over the period of time corresponding to the width of the clamping pulse, the pedestal level of the image signal can be substantially corrected to approximate the ideal pedestal level. Thus, according to the first embodiment as mentioned above, a proper and stable restoration of the direct-current component of an image signal can be ensured. Note, the image signal having the proper direct-current component is converted into a digital video signal by the A/D converter 88, and the digital video signal is outputted to the video processing circuit 64 through the timing-pulse generating circuit 66.

Figure 8:
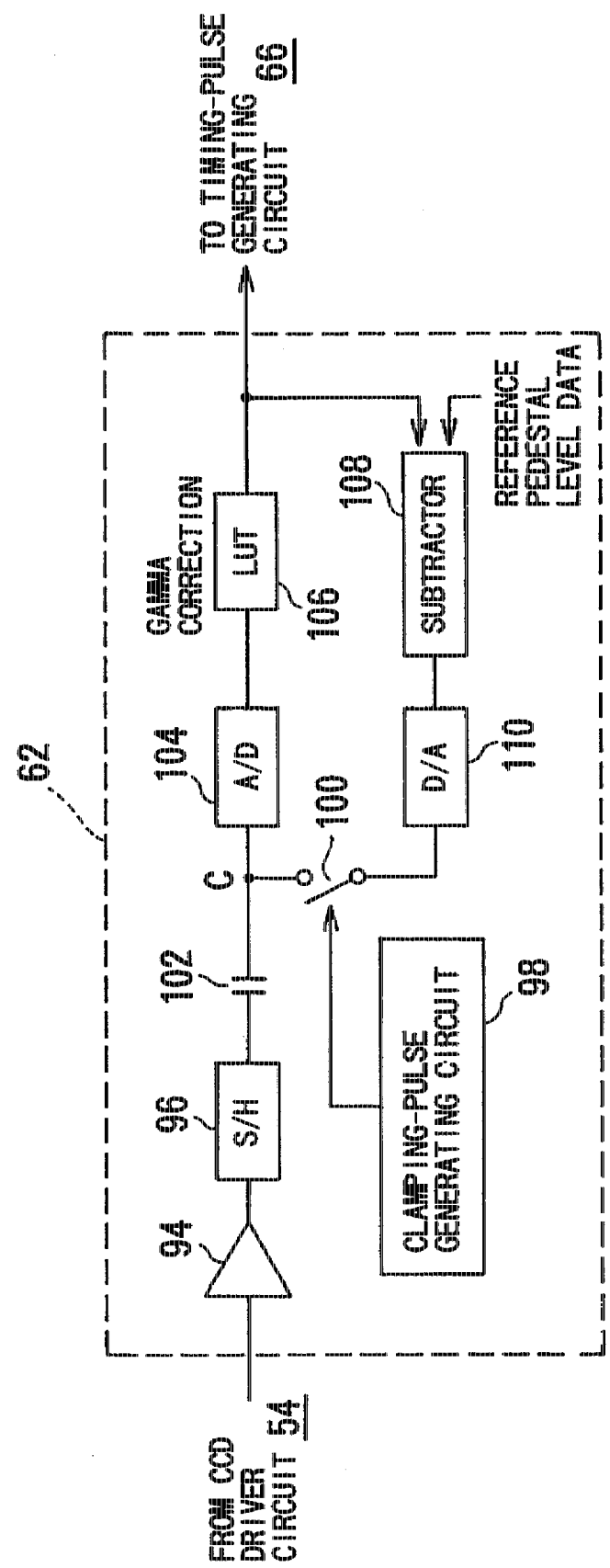
FIG. 8 is a block diagram showing a second embodiment of the CCD processing circuit of the electronic endoscope system of FIG. 4.

FIG. 8 shows a second embodiment of the CCD processing circuit 62 constituted in accordance with the present invention. In this second embodiments an amplifier 94 amplifies an image signal outputted from the CCD driver circuit 54, and the amplified image signal outputted from the amplifier 94 is held by a sample-and-hold circuit (S/H) 96. Note, the image signal held by the sample-and-hold circuit 96 does not have a direct-current component. A clamping-pulse generating circuit 98 produces a clamping pulse during a horizontal blanking period of the image signal. When the clamping pulse is outputted from the clamping-pulse generating circuit 98 to a switch 100, the switch 100 is turned ON for a period of time corresponding to a width of the clamping pulse, so that a capacitor 102 is electrically charged so that a potential of a location C is fixed as a pedestal level. Then, an analog value of the pedestal level is converted into a digital pedestal level data by an analog-digital (A/D) converter 104. The digital pedestal level data is outputted from the A/D converter 104 to a look-up table (LUT) 106 at which the digital pedestal level data is subjected to a gamma correction.

Figure 9:
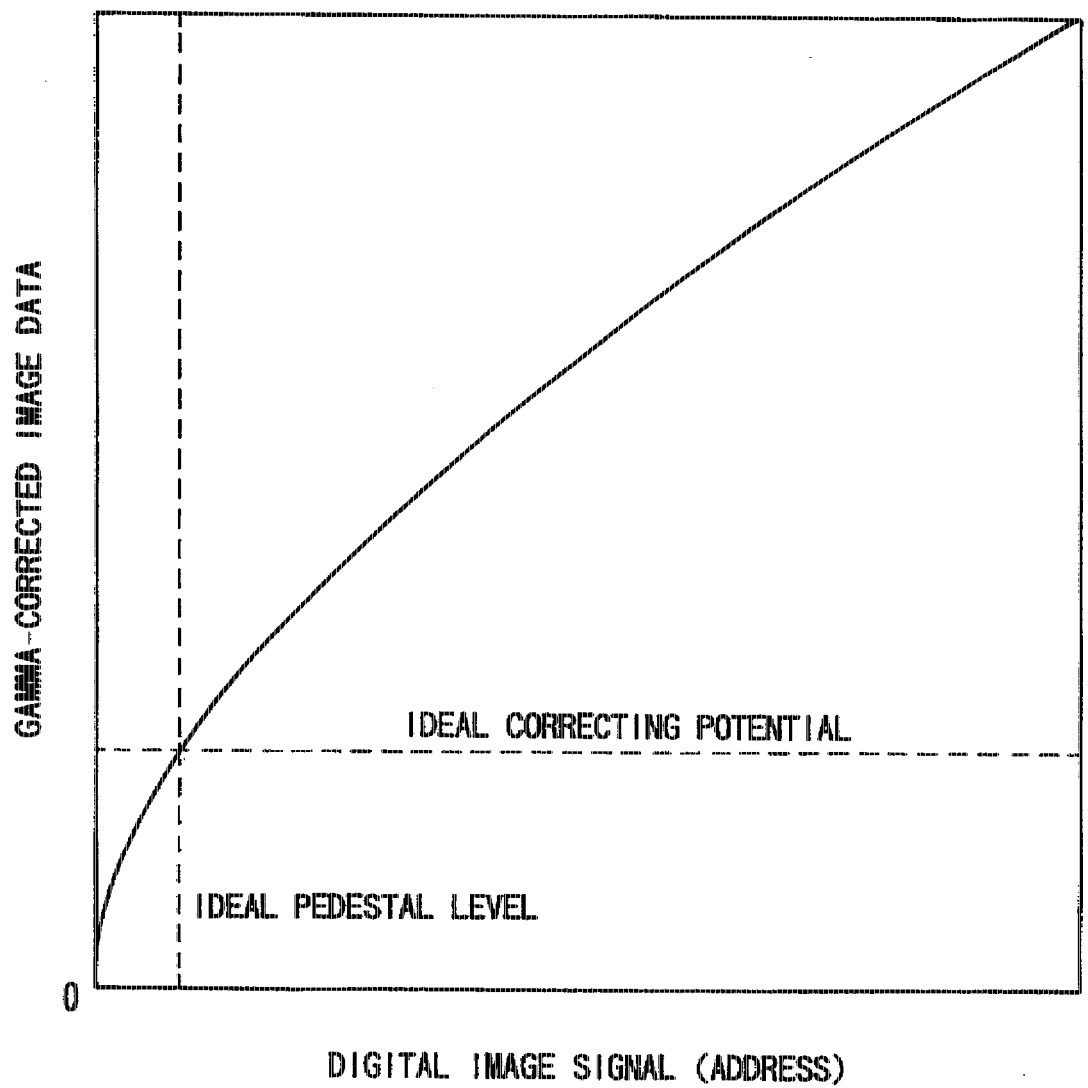
FIG. 9 is a graph showing an input/output characteristic of a look-up table used in the second embodiment of FIG. 8.

The look-up table 106 has the gamma-correction characteristic as shown in the graph of FIG. 9. Namely, the look-up table 106 is constituted such that a larger gain is obtained at a dark zone. In particular, the characteristic curve of FIG. 9 has a larger inclination at the dark zone (i.e., at the left side thereof), and thus a pedestal level of the digital video signal outputted from the look-up table 106 is amplified. A subtractor 108 picks up the amplified pedestal level data from the digital video signal subjected to the gamma correction, and the amplified pedestal level is compared with a reference pedestal level data inputted to the subtractor 108. In particular, the difference between the amplified pedestal level data and the reference pedestal level data is calculated as an error by the subtractor 108, and is then outputted as correcting data from the subtractor 108 to a digital-analog (D/A) converter 110 at which the correcting data is converted into a correcting voltage. While the switch 100 is turned ON, the correcting voltage is applied to the capacitor 102, whereby the potential of location C is corrected to be brought close to an ideal pedestal level.

In the second embodiment as mentioned above, the gamma-correction look-up table 106 is utilized in place of the look-up table 90 as shown in FIG. 5 for the correction of the pedestal level of the image data. This is derived from the fact that there is substantially a symmetrical relationship between the characteristic curve of FIG. 6 and the gamma-correction characteristic curve of FIG. 9 with respect to the axis of abacissas. Accordingly, in the second embodiments an additional look-up table is unnecessary for preparing a correcting data for the correction of the pedestal level of the image data.

Accordingly, similar to the first embodiment as mentioned above, by repeating the correction of the potential of location C several times over the period of time corresponding to the width of the clamping pulse, the pedestal level of the image signal can be substantially brought to the ideal pedestal level. Thus, according to the second embodiment of the present invention, a proper and stable restoration of the direct-current component of an image signal can also be ensured.

The present invention is also directed to a solution of another problem with the conventional image-signal clamping circuit as shown in FIG. 3. In particulars in this conventional clamping circuit, when high-frequency noise is included in a pedestal level zone of an image signal, the noise is added as an error component to the correcting voltage outputted from the digital-analog converter 30. Accordingly, the addition of the noise component to the correcting voltage should be prevented, before reproduction of an image with the high fidelity required by an endoscope can be ensured.

Figure 10:
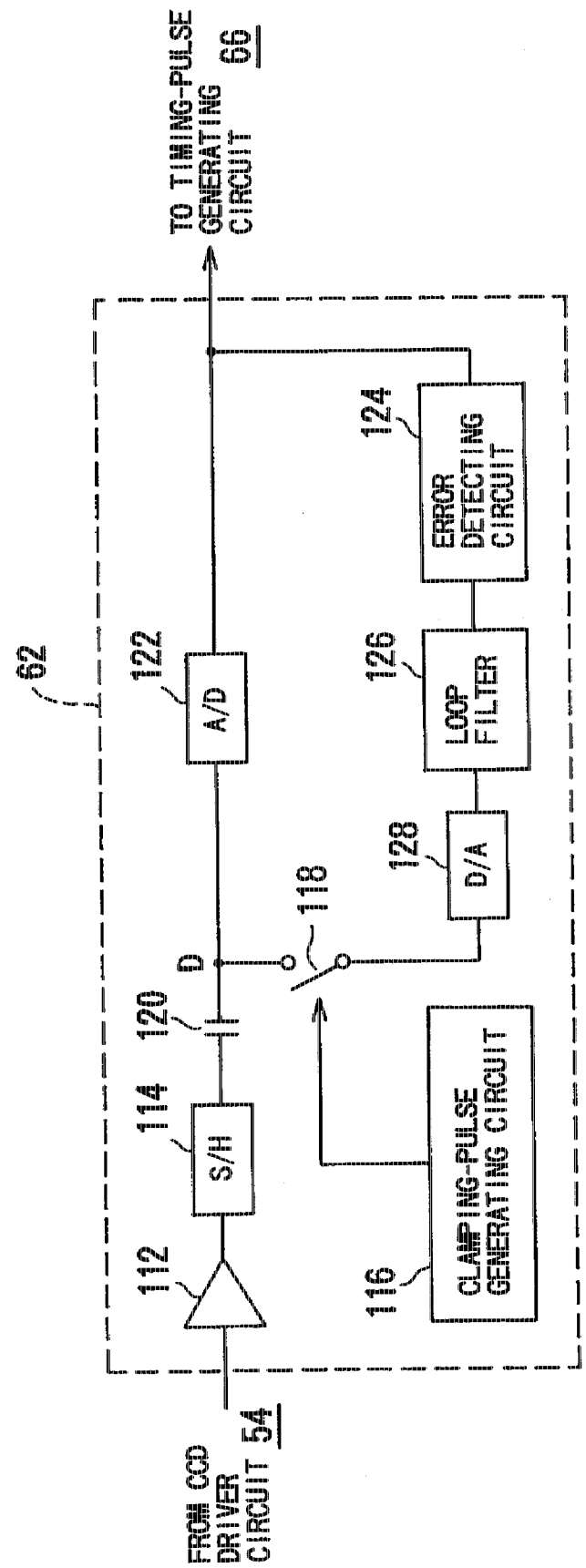
FIG. 10 is a block diagram showing a third embodiment of the CCD processing circuit of the electronic endoscope system of FIG. 4.

FIG. 10 shows a third embodiment of the CCD processing circuit 62 constructed so as not to be affected by high-frequency noise included in the pedestal level of the image signal. In the third embodiment, an amplifier 112 amplifies the image signal outputted from the CCD driver circuit 54, and the amplified image signal outputted from the amplifier 94 is held by a sample-and-hold circuit (S/H) 114. Notes the image signal held by the sample-and-hold circuit 114 does not have a direct-current component. A clamping-pulse generating circuit 116 produces a clamping pulse during a horizontal blanking period of the image signal. When the clamping pulse is outputted from the clamping-pulse generating circuit 116 to a switch 118, the switch 118 is turned on for a period of time corresponding to a width of the clamping pulses so that a capacitor 120 is electrically charged so that a potential of a location D is fixed as a pedestal level. Then, an analog value of the pedestal level is converted into digital pedestal level data by an analog-digital (A/D) converter 122. The digital pedestal level data is outputted from the A/D converter 122 to an error detecting circuit 124 for preparing correcting data on the basis of a value of the digital pedestal level data. Note, the error detecting circuit 124 may comprise the circuit arranged by the first register 34, the timing-pulse generating circuit 36, the subtractor 38, the adder 40, and the second register 42 as shown in FIG. 3, the look-up table 90 as shown in FIG. 5, or the circuit arranged by the look-up table 106 and the subtractor 108 as shown in FIG. 8.

The correcting data prepared at the error detecting circuit 124 is outputted to a loop filter 126 for eliminating high-frequency noise therefrom. Accordingly, although high-frequency noise is included in the pedestal level zone of the image signal, the correcting data is protected from being affected by the noise. Then, the correcting data is outputted from the loop filter 126 to a digital-analog (D/A) converter 128 at which the correcting data is converted into a correcting voltage. While the switch 118 is turned ON, the correcting voltage is applied to the capacitor 120, so the potential of location D is corrected to be brought close to an ideal pedestal level.

Figure 11:
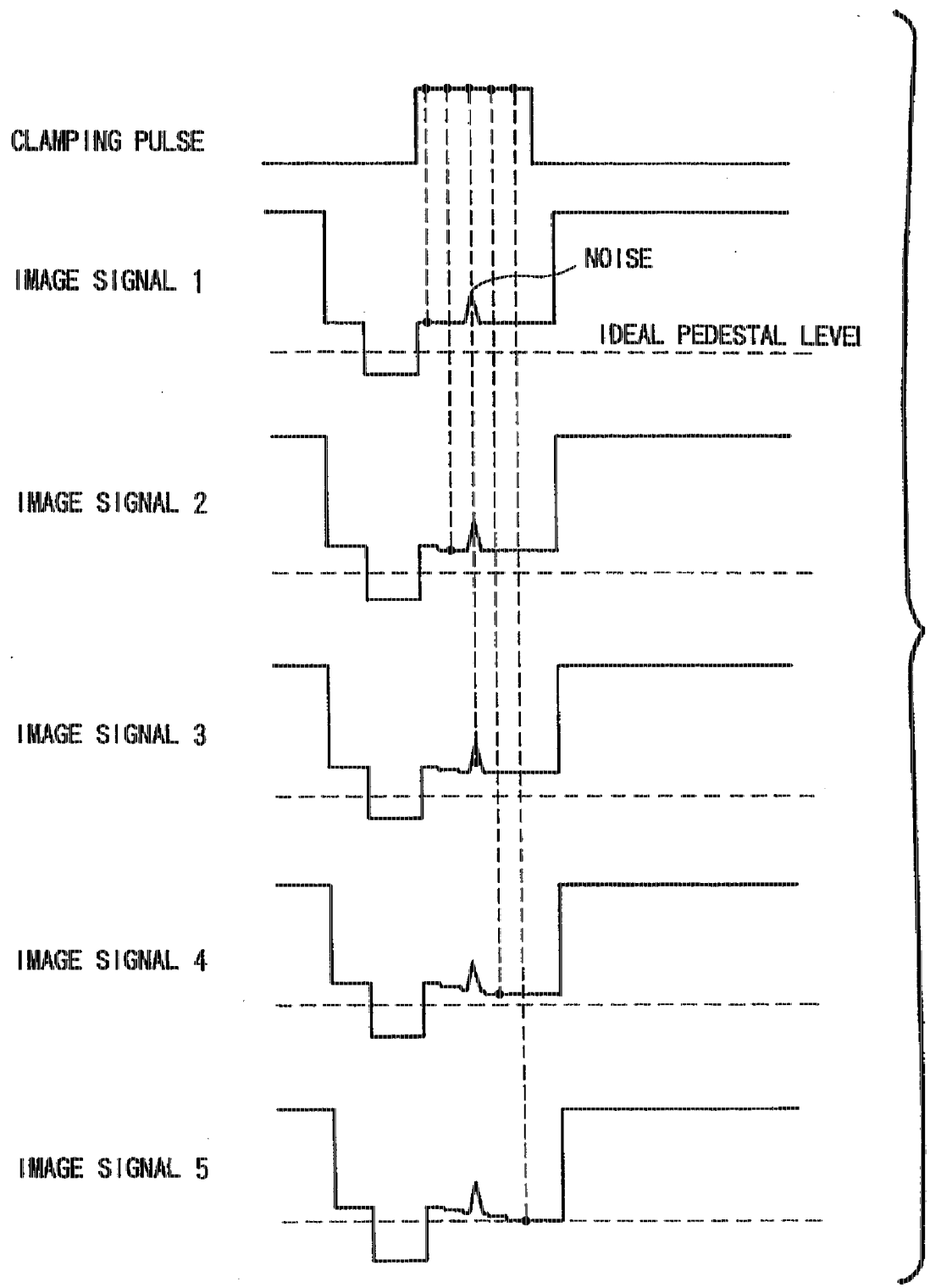
FIG. 11 is a timing diagram for explaining a correction of a pedestal level in the third embodiment of FIG. 10.

Accordingly, as shown in FIG. 11, by repeating the correction of the potential of location D several times over the period of time corresponding to the width of the clamping pulse, the pedestal level of the image signal can be substantially brought to the ideal pedestal level without being affected by the noise. Thus, according to the third embodiment as mentioned above, a proper and stable restoration of the direct-current component of an image signal can be ensured.

Figure 12:
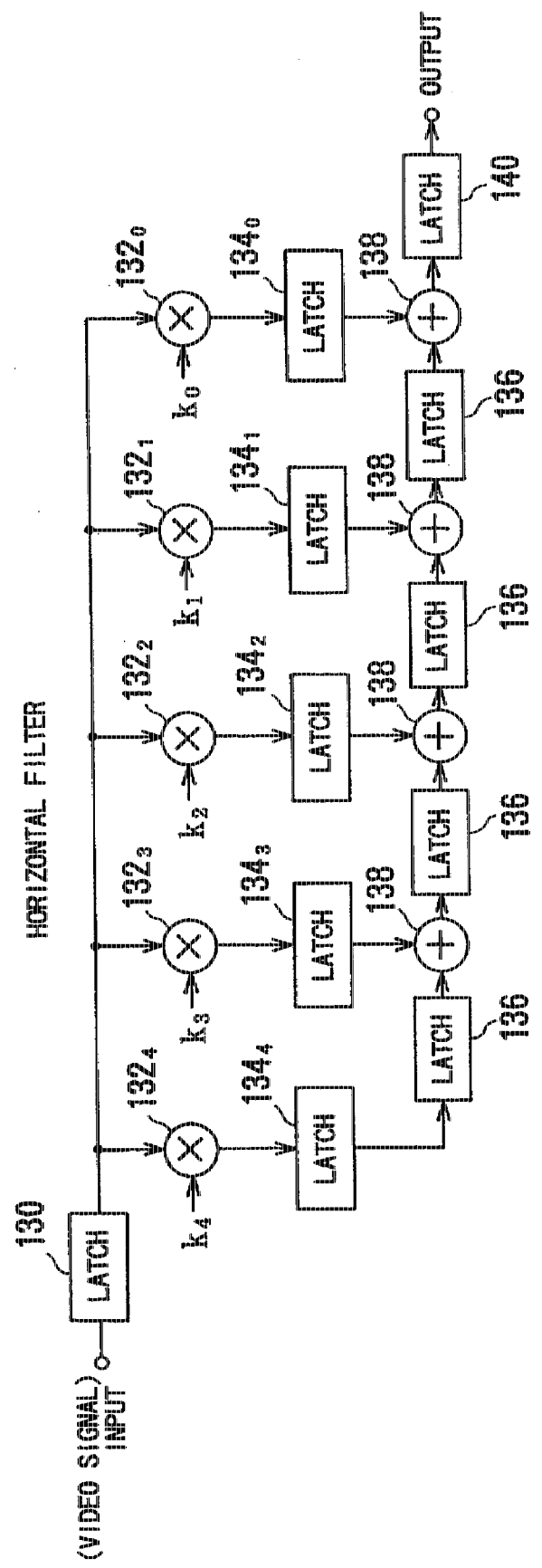
FIG. 12 is a block diagram showing an embodiment of a loop filter used in the third embodiment of FIG. 10.

FIG. 12 shows an embodiment of the loop filter 126, which is constituted as a horizontal filter. In this filter, the correcting data is temporarily held by a latch 130, and is then outputted to five multipliers $132_0$, $132_1$, $132_2$, $132_3$, and $132_4$ at which the respective correcting data are multiplied by constants $k_0$, $k_1$, $k_2$, $k_3$, and $k_4$. The five products so obtained are held by latches $134_0$, $134_1$, $134_2$, $134_3$, and $134_4$, respectively, and are then summed by using four latches 136 and four adders 138. The summed data is temporarily held by a latch 140, and is outputted to the D/A converter 128.

Figure 13:
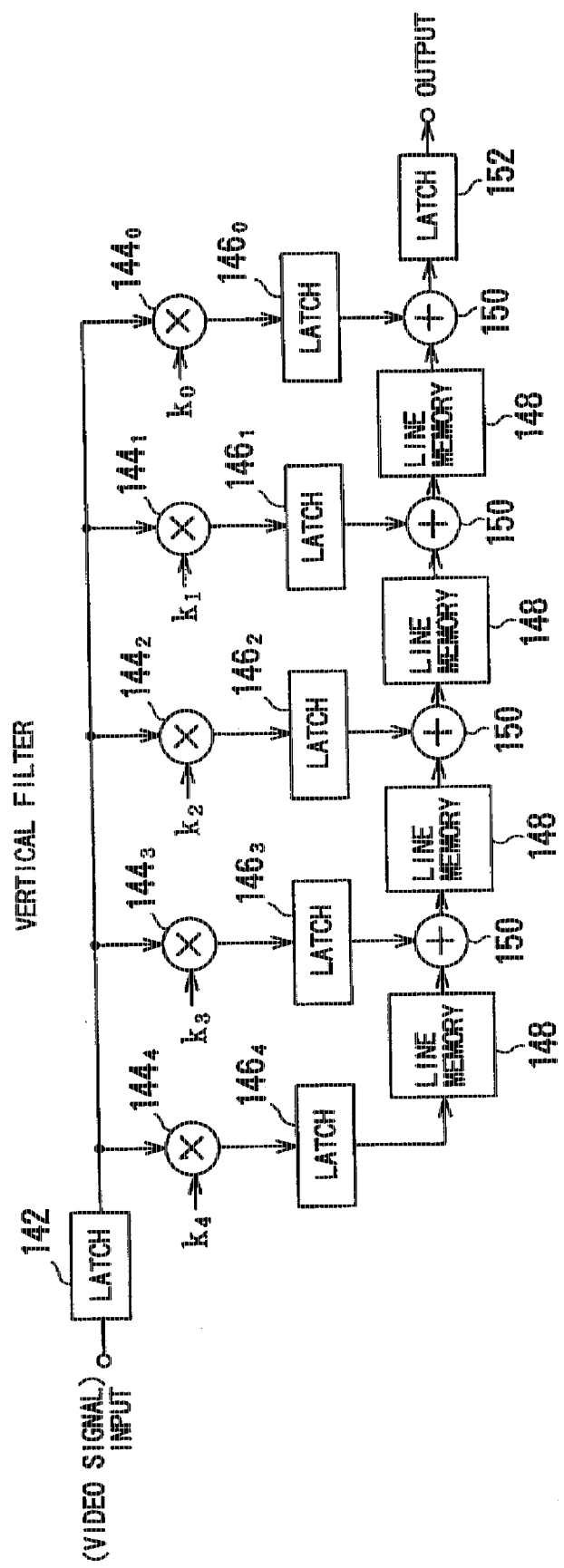
FIG. 13 is a block diagram showing another embodiment of the loop filter used in the third embodiment of FIG. 10.

FIG. 13 shows another embodiment of the loop filter 126, which is constituted as a vertical filter. In this filters the correcting data is temporarily held by a latch 142, and is then outputted to five multipliers $144_0$, $144_1$, $144_2$, $144_3$, and $144_4$ at which the respective correcting data are multiplied by constants $k_0$, $k_1$, $k_2$, $k_3$, and $k_4$. The five products so obtained are held by latches $146_0$, $146_1$, $146_2$, $146_3$, and $146_4$, respectively, and are then summed by using four line-memories 148 and four adders 150. The summed data is temporarily held by a latch 152, and is outputted to the D/A converter 128.

Figure 14:
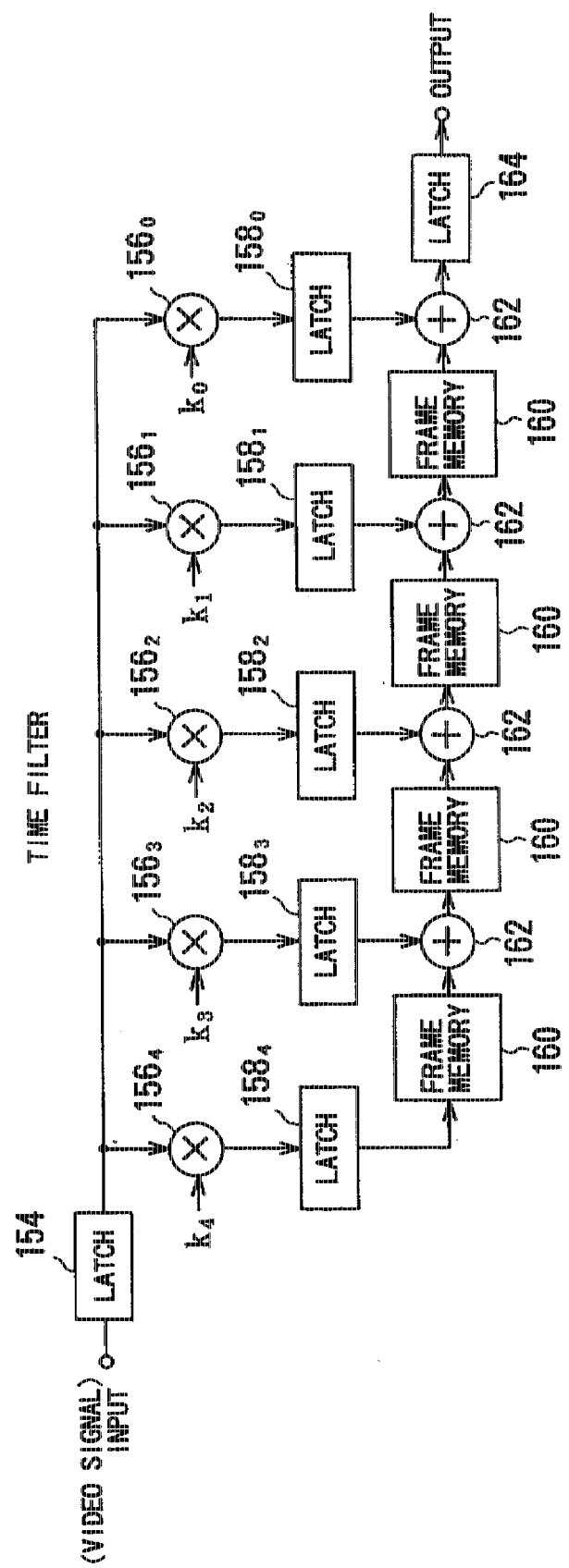
FIG. 14 is a block diagram showing yet another embodiment of the loop filter used in the third embodiment of FIG. 10.

FIG. 14 shows yet another embodiment of the loop filter 126, which is constituted as a time filter. In this filter, the correcting data is temporarily held by a latch 154, and is then outputted to five multipliers $156_0$, $156_1$, $156_2$, $156_3$, and $156_4$ at which the respective correcting data are multiplied by constants $k_0$, $k_1$, $k_2$, $k_3$, and $k_4$. The five products so obtained are held by latches $158_0$, $158_1$, $158_2$, $158_3$, and $158_4$, respectively, and are then summed by using four line-memories 160 and four adders 162. The summed data is temporarily held by a latch 164, and is outputted to the D/A converter 128.

Although each of the digital filter circuits shown in FIGS. 12, 13, and 14 is referred to as an embodiment of the loop filter 126, it should be understood that the loop filter 126 may be constituted by a combination of any two of the digital filter circuits shown in FIGS. 12, 13, and 14, or by a combination of the three digital filter circuits. Nevertheless, the digital filter circuit shown in FIG. 12 is most preferable as the loop filter 126, because this filter circuit can be made at low cost, and because a filtering operation thereof is very fast, due to the fact that it has no memory.

Figure 15:
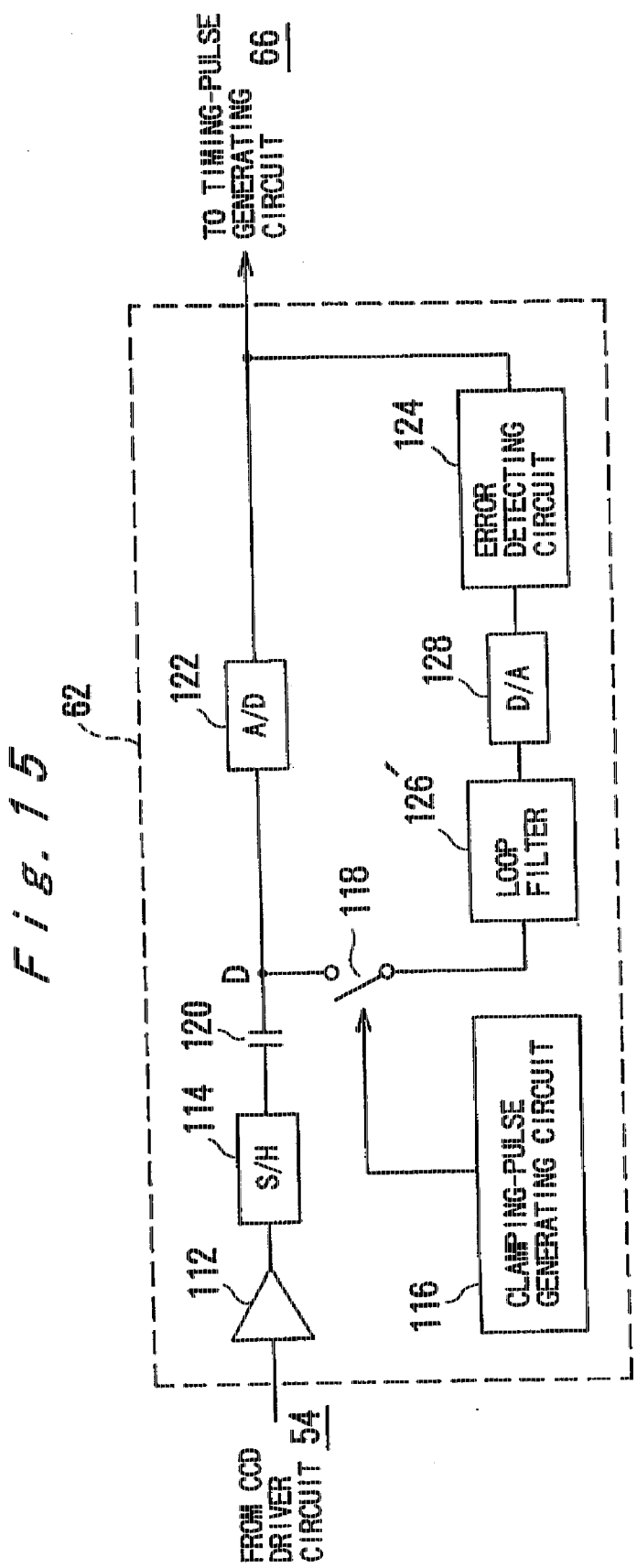
FIG. 15 is a block diagram showing a modification of the third embodiment of FIG. 10.
Figure 16:
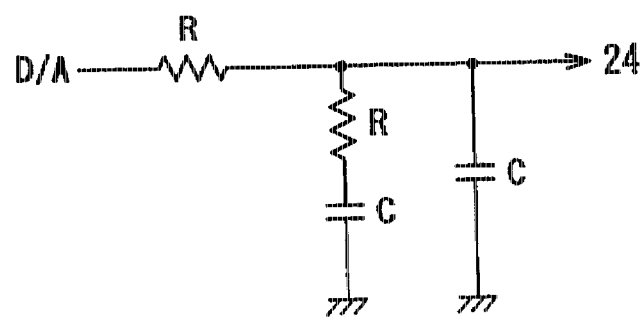
FIG. 16 is a block diagram showing an embodiment of a loop filter used in the modification of FIG. 15.

FIG. 15 shows a modification of the third embodiment shown in FIG. 10. Notes in FIG. 15, elements corresponding to those of FIG. 10 are designated by the same references. In this modified embodiment, a loop filter 126' is constituted as an analog circuit, and is provided between the switch 118 and the D/A converter 128. The analog filter circuit 126' may be a CR type filter circuit including capacitors C and resistors R, as shown in FIG. 16.

Furthermore, the present invention is directed to a solution of yet another issue involved in the conventional image-signal clamping circuit as shown in FIG. 1. In particular, as discussed hereinbefore, the restoration of a direct-current component of an image signal cannot be properly and stably carried out, because the charging of the capacitor 16 by the reference-voltage generating circuit 20 involves a time constant defined by the characteristics of the capacitor 16 and the resistor 22. It can be said that this is derived from the fact that an analog processing is performed for the restoration of the direct-current component of the image signal.

Figure 17:
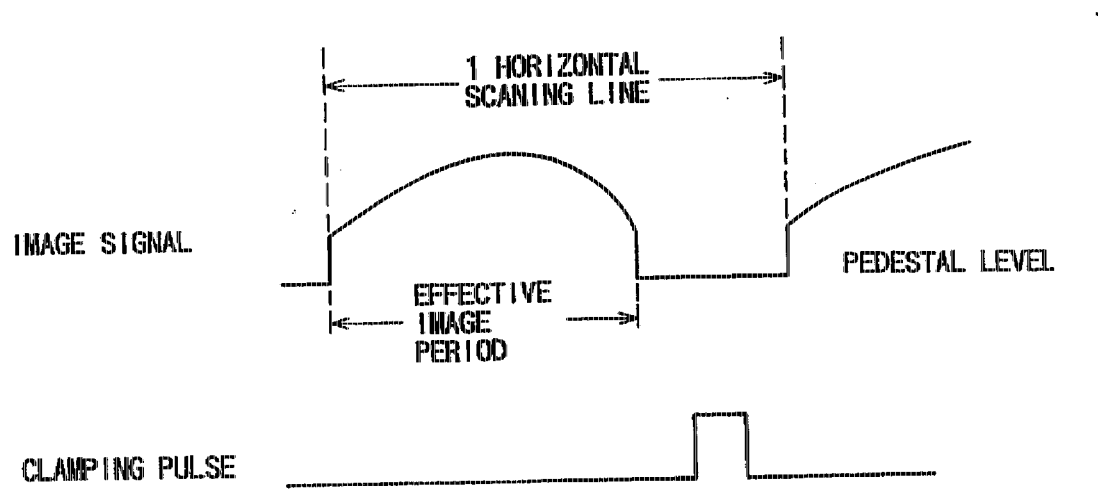
FIG. 17 is a view for explaining a relationship between an image signal and a clamping pulse, in which the image signal corresponding to one horizontal scanning line has a black level period situated at the back side of an effective image-period thereof.

On the other hand, a solid state image sensor such as a CCD image sensor used in an electronic endoscope is frequently constituted such that an image signal corresponding to one horizontal scanning line has an optical black level period, indicating a provisional pedestal level, situated at the end of an effective image-period thereof, as shown in FIG. 17. In this case, although a clamping pulse is produced in synchronization with the black level period of the horizontal scanning line concerned, as shown in FIG. 17, the actual image signal included in the effective image-period thereof cannot be clamped on the basis of the black level thereof. Namely, the actual image signal included in the effective image-period of the next horizontal scanning line is clamped on the basis of the black level of the horizontal scanning line concerned. This hinders the proper restoration of the direct-current component of the image signal.

FIG. 18 shows a fourth embodiment of the CCD processing circuit 62 constituted such that the issues just mentioned above can be solved. In the fourth embodiment, an amplifier 166 amplifies an image signal outputted from the CCD driver circuit 54, and the amplified image signal outputted from the amplifier 94 is held by a sample-and-hold circuit (S/H) 168. The image signal held by the sample-and-hold circuit 114 and does not have a direct-current component, and is outputted to an analog-digital (A/D) converter 170, and is converted into a digital video signal. Then, the digital video signal outputted from the A/D converter 170 is inputted to a line memory 172, and the actual image data included in the digital image signal is temporarily stored in the line memory 172. OH the other hands the digital video signal outputted from the A/D converter 170 is also inputted to a register 174, and a pedestal level data included in the digital video signal is detected and stored in the register 174 by outputting a clamping pulse from a clamping-pulse generating circuit 176 to the register 174 during a horizontal blanking period of the image signal. Subsequently, the actual image data and the pedestal level data are synchronously outputted from the line memory 172 and register 174, respectively, to a subtractor 178 at which a subtraction is made therebetween. Accordingly, a digital video signal outputted from the subtractor 178 is given a fixed pedestal level or direct-current component.

In shorts according to the fourth embodiment of the present invention, a direct-current of an image signal can be properly and stably restored because digital processing is performed for the restoration of a direct-current component of an image signal. Also, although an image signal corresponding to one horizontal scanning line has a black level period situated at the back side of an effective image-period thereof, an actual image signal included in the effective image-period of the horizontal scanning line concerned can be clamped on the basis of the black level thereof. Namely, it is possible to carry out the proper restoration of the direct-current component of the image signal, regardless of whether or not a solid state image sensor such as a CCD image sensor used in an electronic endoscope is constituted such that an image signal corresponding to one horizontal scanning line has an optical black level period situated at the back side of an effective image-period thereof.

It will be understood by those skilled in the art that the foregoing description is of a preferred embodiment of the disclosed clamping circuit, and that various changes and modifications may be made to the present invention without departing from the spirit and scope thereof.

The present disclosure relates to subject matters contained in Japanese Patent Applications No. 6-214479 (filed on Sep. 8, 1994), No. 6-214480 (filed on Sep. 8, 1994), No. 6-215425 (filed on Sep. 9, 1994), and No. 6-226124 (filed on Sep. 21, 1994), which are expressly incorporated herein, by reference, in their entireties.

We claim:

1. An image-signal clamping circuit for processing image signals obtained from a solid state image sensor provided at a distal end of an electronic endoscope, comprising:

fixing device for fixing a pedestal level of an image signal obtained from said solid state image sensor;

first conversion device for converting said image signal into digital image data;

preparation device for preparing digital correcting data on the basis of pedestal level data of said digital image data in accordance with a look-up table; and second conversion device for converting said digital correcting data into analog correcting data, wherein said fixing of the pedestal level of said image signal is carried out in accordance with said analog correcting data, such that the pedestal level of said image signal approximates an ideal pedestal level, said fixing device comprising a sample-and-hold circuit that temporarily holds said image signal, a capacitor connected to an output of said sample-and-hold circuit, a switch provided between said capacitor and said second conversion device, a clamping-pulse generation circuit that outputs a clamping pulse to said switch such that said switch is turned ON for a period of time corresponding to a width of said clamping pulse.

2. An image-signal clamping circuit as set forth in claim 1, wherein said digital correcting data output by said look-up table is based on the pedestal level data of said digital image data inputted to said look-up table.

3. An image-signal clamping circuit for processing image signals obtained from a solid state image sensor provided at a distal end of an electronic endoscope, comprising:

fixing device for fixing a pedestal level of an image signal obtained from said solid state image sensor;

first conversion device for converting said image signal into digital image data;

preparation device for preparing digital correcting data on the basis of pedestal level data of said digital image data in accordance with a look-up table; and second conversion device for converting said digital correcting data into analog correcting data, wherein said fixing of the pedestal level of said image signal is carried out in accordance with said analog correcting data, such that the pedestal level of said image signal approximates an ideal pedestal level, said look-up table providing for a gamma-correction for said digital image data, said preparation mean further comprising a subtractor that calculates a difference between a reference data and a pedestal level data of digital image data subjected to a gamma-correction by said gamma-correction look-up table.

4. An image-signal clamping circuit as set forth in claim 3, wherein said first conversion device comprises an analog-digital converter connected to a capacitor, said second conversion device comprises a digital-analog converter connected to a switch, and said subtractor is provided between said gamma-correction look-up table and said digital-analog converter.

5. An image-signal clamping circuit for processing image signals obtained from a solid state image sensor provided at a distal end of an electronic endoscope, comprising:

fixing device for fixing a pedestal level of an image signal obtained from the solid state image sensor;

first conversion device for converting said image signal into digital image data;

gamma-correction device for subjecting said digital image data to a gamma-correction, said gamma-correction device amplifying said pedestal level data of said digital image data;

preparation device for preparing digital correcting data based on said amplified pedestal level data of said digital image data; and second conversion device for converting said digital correcting data into analog correcting data, wherein said fixing of said pedestal level of said image signal is carried out in accordance with said analog correcting data, such that said pedestal level of said image signal approximates an ideal pedestal level.

6. An image-signal clamping circuit as set forth in claim 5, wherein said fixing device comprises a sample-and-hold circuit for temporarily holding the image signal, a capacitor connected to an output of said sample-and-hold circuit, a switch provided between said capacitor and said second conversion means, and a clamping-pulse generation circuit for outputting a clamping pulse to said switch such that said switch is turned ON for a period of time corresponding to a width of said clamping pulse.

7. An image-signal clamping circuit as set forth in claim 6, wherein said first conversion device comprises an analog-digital converter connected to said capacitor, said second conversion device comprises a digital-analog converter connected to said switch, said gamma-correction means comprises a look-up table connected to an output of said analog-digital converter, and said preparation means comprises a subtractor between provided said look-up table and said digital-analog converter.

8. The image-signal clamping circuit of claim 5, wherein said preparation device includes a subtractor that determines a difference between said pedestal level data of said digital image data and a data reference.

9. The image-signal clamping circuit of claim 8, wherein said pedestal level data of said digital image data is subjected to a gamma-correction.

10. An image-signal clamping circuit for processing image signals obtained from a solid state image sensor provided at a distal end of an electronic endoscope, comprising:

fixing device for fixing a pedestal level of an image signal obtained from said solid state image sensor;

first conversion device for converting said image signal into digital image data;

preparation device for preparing digital correcting data on the basis of pedestal level data of said digital image data;

filter device for eliminating noise from said digital correcting data; and second conversion device for converting the filtered digital correcting data into analog correcting data, wherein said fixing of the pedestal level of said image signal is carried out based on said analog correcting data, such that the pedestal level of said image signal approximates an ideal pedestal level, said fixing device comprising a sample-and-hold circuit that temporarily holds said image signal, a capacitor being connected to an output of said sample-and-hold circuit, a switch being provided between said capacitor and said second conversion device, and a clamping-pulse generation circuit outputting a clamping pulse to said switch such that said switch is turned ON for a period of time corresponding to a width of said clamping pulse.

11. An image-signal clamping circuit as set forth in claim 10, wherein said first conversion device comprises an analog-digital converter connected to said capacitor, said second conversion device comprises a digital-analog converter connected to said switch, said preparation device is connected to an output of said analog-digital converter, and said filter is provided between said preparation device and said digital-analog converter.

12. An image-signal clamping circuit for processing image signals obtained from a solid state image sensor provided at a distal end of an electronic endoscope, comprising:

fixing device for fixing a pedestal level of an image signal obtained from said solid state image sensor;

first conversion device for converting said image signal into digital image data;

preparation device for preparing digital correcting data on the basis of pedestal level data of said digital image data;

second conversion device for converting said digital correction data into analog correcting data; and filter device for eliminating noise from said analog correcting data, wherein said fixing of the pedestal level of said image signal is carried out based on filtered analog correcting data, such that the pedestal level of said image signal approximates an ideal pedestal level, said fixing device comprising a sample-and-hold circuit that temporarily holds said image signal, a capacitor being connected to an output of said sample-and-hold circuit, a switch being provided between said capacitor and said second conversion means, and a clamping-pulse generation circuit outputting a clamping pulse to said switch such that said switch is turned ON for a period of time corresponding to a width of said clamping pulse.

13. An image-signal clamping circuit as set forth in claim 12, wherein said first conversion device comprises an analog-digital converter connected to said capacitor, said second conversion device comprises a digital-analog converter connected to said switch, said preparation device is provided between said analog-digital converter and said digital-analog converter, and said filter is provided between said switch and said digital-analog converter.

14. An image-signal clamping circuit for processing image signals obtained from a solid state image sensor provided at a distal end of an electronic endoscope, comprising:

conversion device for converting an image signal, obtained from said solid state image sensor, into digital image data;

first storage device for temporarily storing actual image data of said digital image data, said first storage device being formed as a line memory;

second storage device for temporarily storing pedestal level data of said digital image data;

calculation device for calculating a difference between said actual image data and said pedestal level data to digitally fix a pedestal level of an image signal; and synchronization device for synchronously outputting said actual image data, from said first storage device, and said pedestal level data, from said second storage device, to said calculation means.

* * * * *